No. 715,182.  
Patented Dec. 2, 1902.
W. WAEGEL.
DENTAL FLASK.
(Application filed July 3, 1902.)
(No Model.)
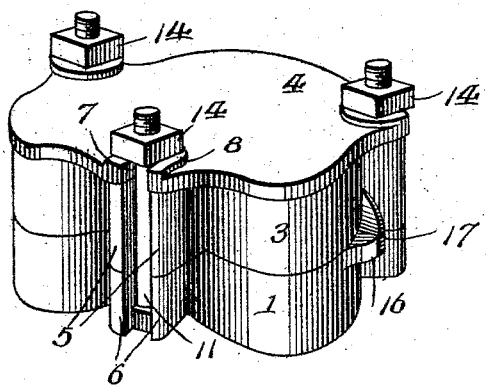
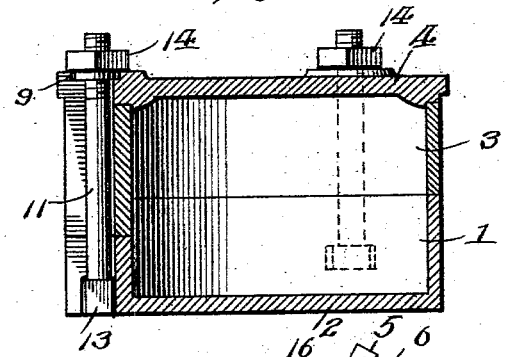
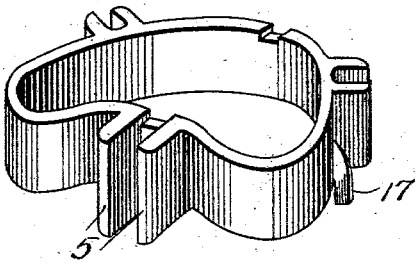
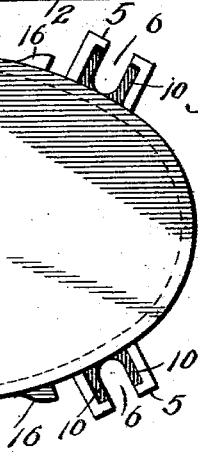
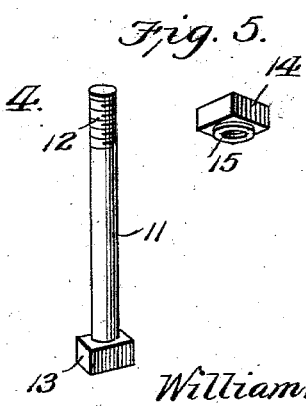
Witnesses  
Geo. Ackman  
Chas. S. Hoyer
Inventor  
William Waegel,  
By Victor J. Evans  
Attorney

UNITED STATES PATENT OFFICE.

WILLIAM WAEGEL, OF READING, PENNSYLVANIA.

DENTAL FLASK.

SPECIFICATION forming part of Letters Patent No. 715,182, dated December 2, 1902.

Application filed July 3, 1902. Serial No. 114,256. (No model.)

*To all whom it may concern:*

Be it known that I, WILLIAM WAEGEL, a citizen of the United States, residing at Reading, in the county of Berks and State of Pennsylvania, have invented new and useful Improvements in Dental Flasks, of which the following is a specification.

This invention relates to a dental flask; and the object sought is to provide simple and effective means for securing the members of the flask together without liability of the fastening devices slipping out of place during the securing operation or after the parts have been assembled and also to render the securing operation convenient by providing means for holding the securing bolts and nuts positively in applied position in relation to the members of the flask.

With these and other objects and advantages in view the invention consists in the construction and arrangement of the several parts, which will be more fully hereinafter described and claimed.

In the drawings, Figure 1 is a perspective view of a flask, showing the features of the invention applied thereto. Fig. 2 is a central transverse vertical section of the flask. Fig. 3 is a detail perspective view of the upper body member of the flask. Fig. 4 is a bottom plan view of the lower body member of the flask. Fig. 5 represents detail perspective views of the form of bolt and nut preferably used in securing the members together.

Similar numerals of reference are employed to indicate corresponding parts in the several views.

The numeral 1 designates a lower body member of a flask which has a closed bottom 2, and thereon is disposed an upper body member 3, over which a cover 4 is arranged. The shape of the entire flask and the members composing the same is well understood in the art, and as the advantage of the contour shown is appreciated it will be unnecessary to explain the same. In many of the flasks in use great difficulty has been experienced in securing the parts or members thereof in such manner that they will be reliably held together, and much annoyance has arisen from a failure of the old form of fastenings remaining in operative relation to the flask members during the securing operation, and frequently irregular pulls on the flask members, owing to displacement of the fastening means therefor, have resulted in the disarrangement of the mold and coöperating devices held within the flask. The present improvement has been designed to overcome these difficulties as before set forth, and in constructing the members 1 and 3 they are formed with upwardly-projecting flanges or guards 5, extending vertically thereof and having an outwardly-opening space 6 between them. The cover is also formed with inwardly-extending slots 7, having upper surrounding raised rims 8. The flanges 5 and slots 7, with their surrounding rims, are formed in the members 1 and 3 and cover 4 at three points in triangular relation to effectively secure the members and cover in view of the contour or shape of the said parts. The rims 8 are formed with countersunk seats 9, as clearly indicated by Fig. 2, and the lower portions of the flanges 5 of the bottom member 1 have inner angular recesses 10 extending upwardly thereinto and unitedly forming sockets of substantial angular contour.

The securing means for the members 1 and 3 and cover 4 comprise bolt-rods 11, having upper screw-threaded terminals 12 and lower heads 13, preferably of rectangular form, and coöperating with said bolt-rods are nuts 14, formed with depending bosses 15, which in the present instance are circular in form to fit in the sockets 9 of the rims 8. Instead of the bosses 15 separate washers may be used and inserted in the sockets with equal efficiency. In arranging these fastening devices the bolt-rods 11 are pushed upwardly through the spaces 6 between the flanges 5 of the members 1 and 3 and also through the slots 7, with the heads 13 resting in the sockets 10, the said heads when in the sockets preventing the bolt-rods from turning, and thereby facilitating the application of the nuts 14. After the bolt-rods have been inserted in the spaces 6, as set forth, the nuts are then applied and screwed down until the bosses 15 enter the sockets 9. As well known in the art to which this invention pertains, what may be termed the "rear" bolt-rod 11 is longer than those in advance of the same for convenience in assembling and separating the members 1 and 3 without liability of laterally shifting the member 3 on the member 1. In other words, the forward bolt-rods on opposite sides of the center and substantially at the front of the flask may have the nuts thereon removed and said bolt-rods pushed downwardly far enough to clear the heads thereof from the sockets in the flanges of the bottom member, and after the nut on the rear bolt-rod is disengaged the cover 4 may be readily removed and the section 3 drawn upwardly from the mold and guided by the rear bolt-rod in such manner as to assist in preventing lateral movement of the upper member 3, and thereby avoid liability of injury to the portion of the mold in said latter member. This differentiation in the length of the bolt-rods is also important and advantageous in assembling the members 1 and 3 in the preliminary steps of the molding operation, as the front bolt-rods can be easily applied without lifting the members 1 and 3 from a supporting-base. To accommodate this operation, the flanges 5 of the bottom member 1 at opposite points and near the front of the same are elevated or of less vertical extent than the rear flanges, as clearly shown by Figs. 1 and 2.

When the bosses 15 and sockets 9 are used, the nuts 14 will be prevented from slipping out of place, and the cover 4, as well as the members 1 and 3, will be more positively tightened and held against liability of displacement. To assist in preventing rotary twisting movement of the member 3 on the member 1, the latter has shouldered stop-lugs or projections 16, with which depending fingers 17 in corresponding positions on the member 3 are adapted to engage. This is also a well-known feature of invention in this art.

From the foregoing description it will be understood that the present invention refers to what are known as "anchor" or "slot" flasks, and the particular construction of the several parts conjointly operate to render this class of devices more effective and convenient in the operation of molding. To reduce the friction as much as possible, the bottoms of the sockets 9 are horizontally flat and the faces of the bosses 15 engaging with the said bottoms are also flat.

Having thus fully described the invention, what is claimed as new is—

1. A flask comprising a bottom member, an upper member, and a cover in separable relation, the bottom member having vertical flanges projected outwardly therefrom from the top to the bottom and provided with spaces between them and also formed with sockets in their lower ends, the upper member having correspondingly-spaced flanges extending fully from the lower to the top edges thereof and the cover having inwardly-projecting slots, said members also having other flanges extending partially over the height of the lower member and fully over the height of the upper member and corresponding in structure to the first-named flanges, bolt-rods extending upwardly through the flanges and having the heads thereof engaging the sockets in the lower ends of the flanges, and nuts removably applied to the upper ends of the bolt-rods and bearing on the rim of the cover, interposed holding devices being located between the nuts and the adjacent portions of the cover.

2. A flask comprising separable top and bottom members and a cover, the two members having outwardly-projecting flanges with spaces between them in vertical alinement, the lower ends of the flanges on the bottom member being formed with inclosed sockets, and the cover having slots extending thereinto to coincide with the spaces between the flanges and surrounded by rims with recesses in the upper sides thereof, bolt-rods extending vertically through the flanges of the members and the slots and having angular heads held in the sockets in the lower ends of the flanges of the bottom member, washers surrounding the bolt-rods and resting in the recesses in the upper sides of the rims, and nuts removably mounted on the bolt-rods and bearing upon the washers and rims, the flanges extending over the full vertical height of the top member and a portion of the same extending the full vertical height over the lower member whereby the bolt-rods will be inclosed within the flanges.

In testimony whereof I affix my signature in presence of two witnesses.

WILLIAM WAEGEL.

Witnesses:
CHARLES R. WERNER,
CHAS. R. RISDON.